United States Patent
Haile et al.

(10) Patent No.: US 7,549,927 B2
(45) Date of Patent: Jun. 23, 2009

(54) TUNABLE DAMPER FOR A TORQUE TRANSFERRING ASSEMBLY

(75) Inventors: Yohannes Haile, Canton, MI (US); Michael W. Hopson, Clinton Township, MI (US); Niaz A. Khwaja, Livonia, MI (US); Trenton S. Meehan, Ann Arbor, MI (US); Rand Sutherland Schenck, Saint Joseph, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 357 days.

(21) Appl. No.: 11/527,051

(22) Filed: Sep. 25, 2006

(65) Prior Publication Data

US 2008/0076586 A1 Mar. 27, 2008

(51) Int. Cl.
*F16F 7/104* (2006.01)
(52) U.S. Cl. ........................... 464/180; 181/207
(58) Field of Classification Search ......... 464/127, 464/180, 181, 183, 903; 446/486; 181/207
See application file for complete search history.

(56) References Cited

U.S. PATENT DOCUMENTS

| 2,001,166 | A | | 5/1935 | Swennes |
| 2,751,765 | A | | 6/1956 | Rowland |
| 3,659,434 | A | | 5/1972 | Wolfe |
| 4,305,582 | A | * | 12/1981 | Barton ............... 446/486 |
| 4,909,361 | A | | 3/1990 | Stark |
| 5,326,324 | A | | 7/1994 | Hamada |
| 5,566,721 | A | | 10/1996 | Breese |
| 6,234,911 | B1 | * | 5/2001 | Breese et al. ........... 464/903 |
| 6,752,722 | B2 | * | 6/2004 | Armitage et al. ........ 464/180 |
| 7,134,964 | B2 | * | 11/2006 | Dine et al. ............. 464/180 |
| 2004/0192451 | A1 | | 9/2004 | Armitage |
| 2005/0126848 | A1 | * | 6/2005 | Siavoshai et al. ........ 181/207 |
| 2007/0072688 | A1 | * | 3/2007 | Dickson et al. ......... 464/180 |

OTHER PUBLICATIONS

Reilly Foam Co., Quality Fabricated Foam Products, 1998-2006, [online], [retrieved on Dec. 15, 2008] Retrieved from the Internet: URL: www.reillyfoam.com/hyfonic.htm.*

* cited by examiner

*Primary Examiner*—Greg Binda
(74) *Attorney, Agent, or Firm*—MacMillan, Sobanski & Todd, LLC

(57) ABSTRACT

A tunable damper for a torque transferring assembly having a tubular shaft including an inner surface defining an elongated cavity includes an input channeling portion and an output channeling portion, wherein each channeling portion is formed from a first predetermined foam material having a first density and a diameter sufficient for providing a resilient bias force against the inner surface of the tubular shaft. The tunable damper further includes at least one absorber formed from a second predetermined foam material having a second density different from the first predetermined foam material and first density, respectively. The at least one absorber is positioned between the input and output channeling portions for attenuating a first predetermined range of frequencies of noise produced or transmitted by the torque transferring assembly.

14 Claims, 1 Drawing Sheet

TUNABLE DAMPER FOR A TORQUE TRANSFERRING ASSEMBLY

TECHNICAL FIELD

The present invention relates to a tunable damper for reducing noise, vibration, and harshness issues associated with torque transferring assemblies, such as vehicle driveshafts and prop shafts.

BACKGROUND OF THE INVENTION

Torque transferring assemblies are widely used in vehicles to transfer torque between the engine and the wheels. Typically, a torque transferring assembly is arranged between a transmission and an axle assembly, a power transfer unit and an axle assembly, or a transfer case and an axle assembly. To reduce weight, torque transferring assemblies typically include a tubular shaft spanning between a source of rotational energy and the axle assembly. Tubular shafts transmit and amplify vibration and noises from the engine, axle assembly, transmission, transfer case, and wheels. Yet another problem with tubular shafts in torque transferring assemblies is that they produce undesirable noise when rocks or other debris forcefully impact the tubular shaft during vehicle operation.

To address the production or transmission of noises by the torque transferring assembly, some manufacturers have used plugs or other internal dampers inserted at specific nodes within the tubular shaft to reduce specific frequencies of noise and vibration based on damping capability limitations. These plugs typically reduce only a narrow band of frequencies, are expensive and require increased assembly time to ensure correct installation at the specific node. Some internal dampers are heavy, thereby mitigating the weight saving benefits of the tubular shaft. Another problem with these plugs or internal dampers is that they generally are not capable of reducing impact noise.

Therefore, there is a need for a lightweight damper for hollow torque transferring assemblies that reduces noise and vibration issues over a wide frequency range to an acceptable level, and is cost efficient to produce and assemble.

SUMMARY OF THE INVENTION

In view of the above, the present invention relates to a lightweight easily assembled and cost efficient tunable damper for reducing noise and vibration in torque transferring assemblies. The torque transferring assembly includes a tubular shaft having an inner surface defining an elongated cavity and a tunable damper cylindrical in shape and retained within the cavity. The tunable damper comprises an input channeling portion and an output channeling portion, wherein each channeling portion is formed from a first predetermined foam material having a first density and a diameter sufficient for providing a resilient bias force against the inner surface of the tubular shaft. The tunable damper further includes at least one absorber formed from a second predetermined foam material having a second density different from the first predetermined foam material and first density, respectively. The at least one absorber is positioned between the input and output channeling portions for attenuating a first predetermined range of frequencies of noise produced or transmitted by the torque transferring assembly.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

DESCRIPTION OF THE PREFERRED EMBODIMENT

Figure 1:
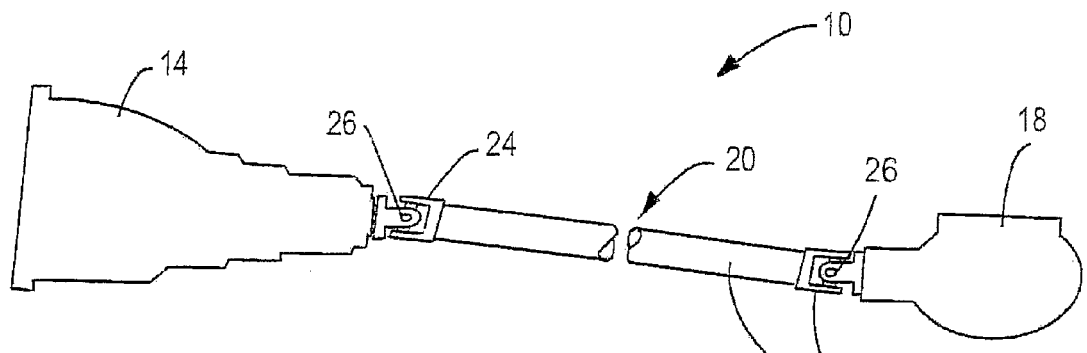
FIG. 1 is a schematic view of a vehicle drivetrain including an exemplary torque transferring assembly.
Figure 3:
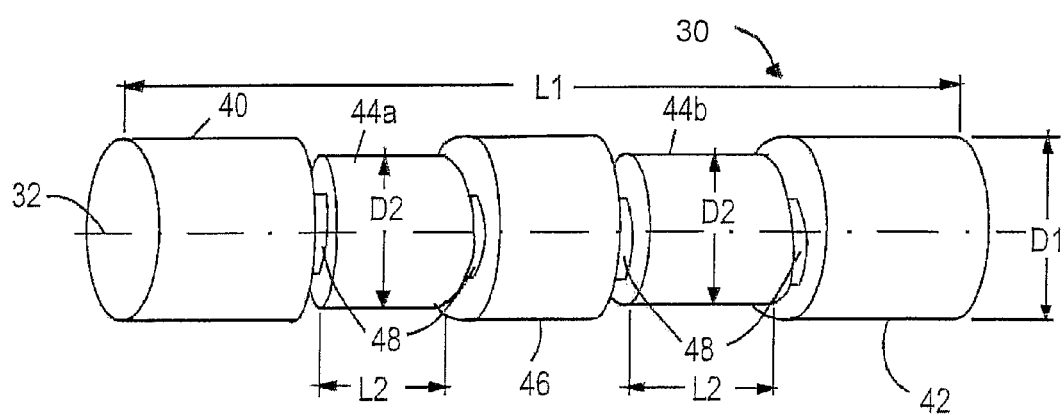
FIG. 3 is a perspective view of the foam damper of the present invention.

An exemplary vehicle driveline 10 is illustrated in FIG. 1 with a torque transferring assembly 20 interconnecting a transmission 14 with an axle assembly 18 to transfer rotational power from an engine (not shown) to wheels (not shown) of a vehicle. The torque transferring assembly 20 is illustrated as a driveshaft and includes a tubular shaft 22 into which a tunable damper 30 is assembled (FIG. 3). The tunable damper 30 reduces noise, vibration, and harshness issues produced or transmitted by the torque transferring assembly 20. The tunable damper 30 may be configured to reduce high range frequency noises and vibrations, low range frequency noises and vibrations, or a combination of low and high range frequency noises and vibrations to create a broadband damper assembly.

Figure 2:
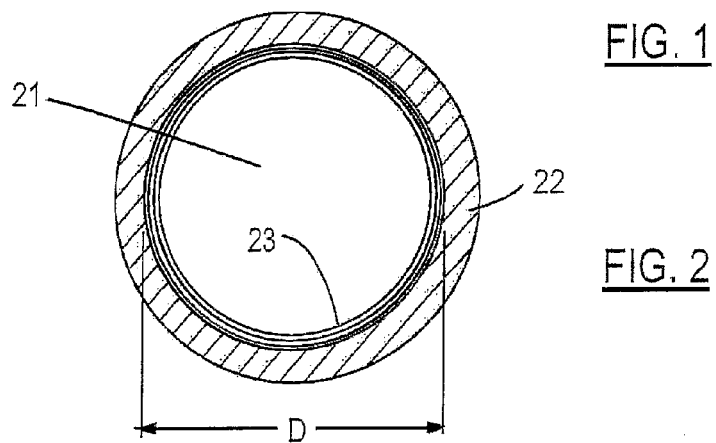
FIG. 2 is a sectional view of a hollow torque transferring assembly.

The torque transferring assembly 20 may be formed in a variety of configurations, but generally include the tubular shaft 22 connected to an output shaft on the transmission 14 and an input shaft on the axle assembly 18 by a pair of universal joints 26. The universal joints 26 include yokes 24 secured to each side of the tubular shaft 22. The torque transferring assembly 20 has a longitudinal axis 32 (FIG. 3) about which the torque transferring assembly, specifically the tubular shaft 22, rotates during operation of the vehicle. As shown in FIG. 2, the tubular shaft 22 includes an inner surface 23 that defines a cavity 21 having an inside diameter D. Although a variety of tubular shapes may be used to form the tubular shaft 22, the tubular shaft 22 is generally cylindrical. The length and diameter of the tubular shaft may also vary depending, for example, on the type of vehicle and the maximum torque to be carried by the torque transferring assembly.

The tunable damper 30 dampens noise and vibration issues produced or transmitted by the torque transferring assembly 20, as well as impact related noises during vehicle operation. As shown in FIG. 3, the tunable damper 30 generally has a length L1 that varies in proportion to the length of the tubular shaft 22, and an elongated shape that generally matches the shape of the tubular shaft 22. The damper length L1 may be as long as the tubular shaft but is generally shorter than the length of the tubular shaft 22 to allow room for swaging and, in the illustrated embodiment, the length L1 of the tunable damper 30 is approximately seventy (70) percent the length of the tubular shaft 22.

Furthermore, the tunable damper 30 is disposed approximately in the center of the tubular shaft 22. By approximately centering the tunable damper 30 within the tubular shaft 22, the assembly is simplified and the necessity to specifically locate the damper assembly along certain nodes within the tubular shaft 22 is eliminated and the tubular shaft 22 may be swaged on each end without interfering with the tunable damper 30.

When the tunable damper 30 is in a relaxed or uncompressed state, such as before installation, the tunable damper 30 generally defines an outside diameter D1 that is greater than the inside diameter D of the tubular shaft 22. The tunable damper 30 further has a longitudinal axis aligned with the longitudinal axis 32 of the torque transferring assembly 20 when the tunable damper 30 is retained within the torque transferring assembly. The tunable damper 30 may be retained without the use of adhesive due to the outside diameter D1 being assembled within the inside diameter D of the torque transferring assembly in an interference fit arrangement. In the illustrated embodiment, the outside diameter D1 of the tunable damper 30 in a relaxed state is approximately 1.1 times larger than the inside diameter D of the tubular shaft 22. Of course, the difference in diameters may vary as needed depending on the application, the type of materials used to form the tunable damper 30, and the amount of interference while maintaining an average density within the desired density range.

The tunable damper 30 is formed from a cylindrical foam material and generally matches the shape of the tubular shaft 22 and is illustrated in FIG. 3 as being cylindrical. The tunable damper 30 includes an input channeling portion 40 and an output channeling portion 42 for enhancing incident wave absorptions. Each channeling portion 40, 42 is preferably formed of a material having elastic properties to provide a resilient bias force against the inner surface 23 of the tubular shaft 22. The material used for the input and output channeling portions should also have suitable noise and vibration absorptions characteristics. One material that meets the above properties is a polymeric foam material such as an open cell polyurethane foam. It has been found that an open cell polyurethane foam having a permeability of 45-75 percent and more specifically 50-70 percent works particularly well. In the exemplary embodiment, the channeling portions 40, 42 have an uninstalled density of approximately no more than 1.2 pcf (pound per cubic foot) and a permeability of approximately 62%.

The tunable damper 30 further includes at least one absorber 44a positioned between the input and output channeling portions 40, 42 for attenuating a first predetermined range of frequencies of noise produced or transmitted by the torque transferring assembly 20. The absorber 44a is preferably formed of a material having elastic properties and suitable attenuation characteristics. In an exemplary embodiment, the material of the absorber 44a is selected using incident absorption coefficient criteria, with a target of 40% for low frequency, 70% or more for mid range frequency and 90% or more for high frequency range. One material that meets the above properties is a foam material such as a HYFONIC foam material. In the exemplary embodiment, the HYFONIC foam material of absorber 44 has a density of approximately no more than 1.7 pcf (pound per cubic foot).

The absorber 44a has a length L2 and a diameter D2, with the length L2 being dependent upon the range of frequencies of noise that is being attenuated. In a preferred embodiment, if it is desirable to attenuate a low range of frequencies, such as 800 Hz or less, the length L2 of the absorber 44a is approximately 2.5 inches. For a mid frequency range, the length L2 of absorber 44a is preferably approximately 1.5 inches. And for a high frequency range, a preferred length L2 is between 0.5 and 1.0 inch. If only one range of frequencies of noise needs to be attenuated, only one absorber 44a would be needed. However, if two different ranges of frequencies need to be attenuated, a second damper 44b may be added as shown in FIG. 3, with a third channeling portion 46 preferably positioned between the first and second absorbers 44a, 44b, respectively. Similarly, a third damper (not shown) could be added if it is desirable to attenuate a third range of frequencies of noise.

In order to maintain an overall length L1 of the tunable damper 30 less than the length of the tubular shaft 22, as discussed above, the lengths of the input and output channeling portions 40, 42 would be chosen after determining the desired length of the absorber 44. In the preferred embodiment, the diameter D2 of the absorber 44 is less than the diameter D1 of the input and output channeling portions 40, 42.

Finally, the tunable damper 30 may include blockers 48 positioned between the channeling portions 40, 42, 46 and the absorbers 44a, 44b for further isolating noise produced or transmitted by the torque transferring assembly 20. The blockers 48 are formed of a thin cardboard material and preferably have a diameter less than the diameter D2 of the absorbers 44. The input and output channeling portions 40, 42, the absorbers 44 and the blockers 48 are coupled to each other via a suitable adhesive, such as a two part polyurethane that forms a flexible bond and cures at room temperature. The adhesive should have resistance to oil, grease, and common cleaning agents.

Thus, the present invention provides a damper 30 that is capable of being tuned to attenuate any desired range of frequencies and even more than one range of frequencies, if needed. This feature allows the tunable damper 30 to be flexible for different uses without additional cost or additional mass being required.

The tunable damper 30 is assembled into the tubular shaft 22 during assembly of the torque transferring assembly 20 by pressing it into place. Once inserted into the tubular shaft 22, the tunable damper 30 is allowed to expand. The resilient biasing force of the tunable damper 30 against the inner surface 23 of the tubular shaft 22 generally provide sufficient force to prevent the tunable damper 30 from moving relative to the tubular shaft 22 without the need for any additional rubber bumpers, adhesive or any other retention technique.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A tunable damper for a torque transferring assembly having a tubular shaft including an inner surface defining an elongated cavity, the damper being cylindrical in shape and comprising:
    an input channeling portion and an output channeling portion, each channeling portion formed from a first predetermined foam material having a first density and a diameter sufficient for providing a resilient bias force against the inner surface of the tubular shaft; and
    at least one absorber formed from a second predetermined foam material having a second density different from the first predetermined foam material and first density, respectively, the at least one absorber positioned between the input and output channeling portions for attenuating a first predetermined range of frequencies of noise produced or transmitted by the torque transferring assembly, wherein the diameter of the input and output channeling portions is larger than a diameter of the at least one absorber.

2. The tunable damper as recited in claim 1 wherein the first predetermined foam material of the input and output channeling portions is an open cell foam.

3. The tunable damper as recited in claim 2 wherein the density of the open cell foam is no more than 1.2 pounds per cubic foot.

4. The tunable damper as recited in claim 1 wherein the density of the second predetermined foam material of the at least one absorber is approximately 1.7 pounds per cubic foot.

5. The tunable damper as recited in claim 1 wherein the diameter of the input and output channeling portions is larger than a diameter of the inner surface of the tubular shaft.

6. The tunable damper as recited in claim 5 wherein the diameter of the input and output channeling portions is approximately 1.1 times the diameter of the inner surface of the tubular shaft.

7. The tunable damper as recited in claim 1 wherein a combined length of the input and output channeling portions and the absorber is less than a length of the tubular shaft.

8. The tunable damper as recited in claim 7 wherein the combined length is approximately 70 percent of the length of the tubular shaft.

9. The tunable damper as recited in claim 1 further comprising a blocker disposed between the at least one absorber and at least one of the input and output channeling portions for further isolating noise produced or transmitted by the torque transferring assembly.

10. The tunable damper as recited in claim 9 wherein a diameter of the at least one absorber is larger than a diameter of the blocker.

11. The tunable damper as recited in claim 1 further comprising a second absorber positioned between the input and output channeling portions for attenuating a second predetermined range of frequencies of noise produced or transmitted by the torque transferring assembly, the second predetermined range of frequencies being different than the first predetermined range of frequencies.

12. The tunable damper as recited in claim 11 further comprising a third channeling portion positioned between the at least one absorber and the second absorber.

13. The tunable damper as recited in claim 1 wherein the first predetermined range of frequencies is a low range of frequencies equal to or less than 800 Hz and wherein the at least one absorber has a length of approximately 2.5 inches.

14. The tunable damper as recited in claim 1 wherein the first predetermined range of frequencies is a range of frequencies greater than 800 Hz and wherein the at least one absorber has a length in the range of 0.5 to 1.5 inch.

* * * * *